US008335988B2

(12) United States Patent
Fahy

(10) Patent No.: US 8,335,988 B2
(45) Date of Patent: Dec. 18, 2012

(54) METHOD OF PRODUCING GRAPHICALLY ENHANCED DATA COMMUNICATIONS

(75) Inventor: William J. Fahy, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1035 days.

(21) Appl. No.: 11/866,004

(22) Filed: Oct. 2, 2007

(65) Prior Publication Data
US 2009/0089693 A1 Apr. 2, 2009

(51) Int. Cl.
G06F 3/00 (2006.01)
G06F 3/048 (2006.01)

(52) U.S. Cl. .................. 715/753; 715/706; 715/758

(58) Field of Classification Search .............. 715/764, 715/747, 771
See application file for complete search history.

(56) References Cited

U.S. PATENT DOCUMENTS

| | | | |
|---|---|---|---|
| 6,085,145 A | 7/2000 | Taka et al. | |
| 6,160,497 A | 12/2000 | Clark | |
| 6,282,488 B1 | 8/2001 | Castor et al. | |
| 6,313,759 B1 | 11/2001 | Musland-Sipper | |
| 6,380,869 B1* | 4/2002 | Simon et al. ............... | 701/3 |
| 6,389,355 B1 | 5/2002 | Gibbs et al. | |
| 6,501,392 B2 | 12/2002 | Gremmert et al. | |
| 6,696,980 B1 | 2/2004 | Langner et al. | |
| 6,812,858 B2 | 11/2004 | Griffin, III | |
| 6,842,122 B1* | 1/2005 | Langner et al. ............ | 340/945 |
| 6,946,976 B1 | 9/2005 | Langner et al. | |
| 6,952,630 B2 | 10/2005 | Hedrick | |
| 7,027,898 B1 | 4/2006 | Leger et al. | |
| 7,103,455 B2 | 9/2006 | Subelet | |
| 7,272,419 B1* | 9/2007 | Schutze et al. ............ | 455/566 |
| 2001/0049596 A1* | 12/2001 | Lavine et al. ............. | 704/9 |
| 2003/0006910 A1 | 1/2003 | Dame | |
| 2004/0111272 A1 | 6/2004 | Gao et al. | |
| 2004/0124998 A1 | 7/2004 | Dame | |
| 2005/0049762 A1 | 3/2005 | Dwyer | |
| 2005/0116956 A1* | 6/2005 | Beardow ................... | 345/473 |
| 2005/0203675 A1 | 9/2005 | Griffin, III et al. | |
| 2005/0203676 A1 | 9/2005 | Sandell | |
| 2006/0191326 A1* | 8/2006 | Smith et al. ............... | 73/73 |
| 2007/0129855 A1* | 6/2007 | Coulmeau ................. | 701/3 |

FOREIGN PATENT DOCUMENTS

WO 02100121 12/2002
WO 2006025860 3/2006

OTHER PUBLICATIONS

International Searching Authority, "International Search Report", Feb. 24, 2009, Published in: WO.

(Continued)

Primary Examiner — Weilun Lo
Assistant Examiner — Truc Chuong
(74) Attorney, Agent, or Firm — Fogg & Powers LLC

(57) ABSTRACT

A method of producing graphically enhanced data communications. The method comprises receiving a datalink text message, parsing the datalink text message into message components, and identifying the message components capable of graphical enhancement by using rules for applying graphical enhancements. The method further comprises retrieving appropriate graphic components from a graphics library corresponding to the identified message components using the rules for applying graphical enhancements, and assembling the graphic components into a composite graphic presentation using rules for assembling graphics. The datalink text message is then combined with the composite graphic presentation for display.

17 Claims, 4 Drawing Sheets

OTHER PUBLICATIONS

European Patent Office, "European Search Report", Apr. 20, 2011, Published in: EP.

"Summons to attend oral proceeding", Dec. 16, 2011, Publisher: European Patent Office, Published in: ep.

"Summons to attend oral proceeding ", May 4, 2012, Publisher: European Patent Office, Published in: EP.

* cited by examiner

METHOD OF PRODUCING GRAPHICALLY ENHANCED DATA COMMUNICATIONS

BACKGROUND

Air traffic control (ATC) centers are used at most airports to coordinate take-offs, landings, and general aircraft traffic around the airport. Traditionally, a pilot uses a radio to speak to an ATC center to request permission or to receive instructions therefrom. With increasing air traffic it has become difficult for ATC centers to process all of the oral communications from aircraft. Consequently, datalink applications have been developed to provide textual communication between pilots and air traffic controllers.

An exemplary datalink application is the Aircraft Communications, Addressing, and Reporting System (ACARS), which is a two-way data communications system used for transmission of text messages between aircraft and ground stations via radio or satellite. A complete datalink communication, which may be generated either manually or automatically, is referred to as a datalink message. Messages from the aircraft to the ground are referred to as downlink messages and messages from the ground to the aircraft are referred to as uplink messages. Services available via datalink include flight plans, weather reports and forecasts, air traffic services, and two-way messaging.

Another datalink application is the Controller Pilot Data Link Communication (CPDLC), which provides for the direct exchange of text messages between an air traffic controller and a pilot. The CPDLC system enables the pilot to communicate electronically with an ATC center by guiding the pilot through a series of screen configurations or displays that either elicit flight information from the pilot or notify the pilot regarding flight information. The CPDLC system is used to send information between aircraft and air traffic control more safely and efficiently.

While datalink text messages between a pilot and a controller can be useful, longer messages, especially those with several interdependent components, can be difficult to comprehend without carefully reading and sometimes re-reading the entire message. Thus, pilot workload is increased because of the time required to comprehend and reply to a longer text message.

SUMMARY

The present invention relates to a method of producing graphically enhanced data communications. The method comprises receiving a datalink text message, parsing the datalink text message into message components, and identifying the message components capable of graphical enhancement by using rules for applying graphical enhancements. The method further comprises retrieving appropriate graphic components from a graphics library corresponding to the identified message components using the rules for applying graphical enhancements, and assembling the graphic components into a composite graphic presentation using rules for assembling graphics. The datalink text message is then combined with the composite graphic presentation for display.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

Figure 1:
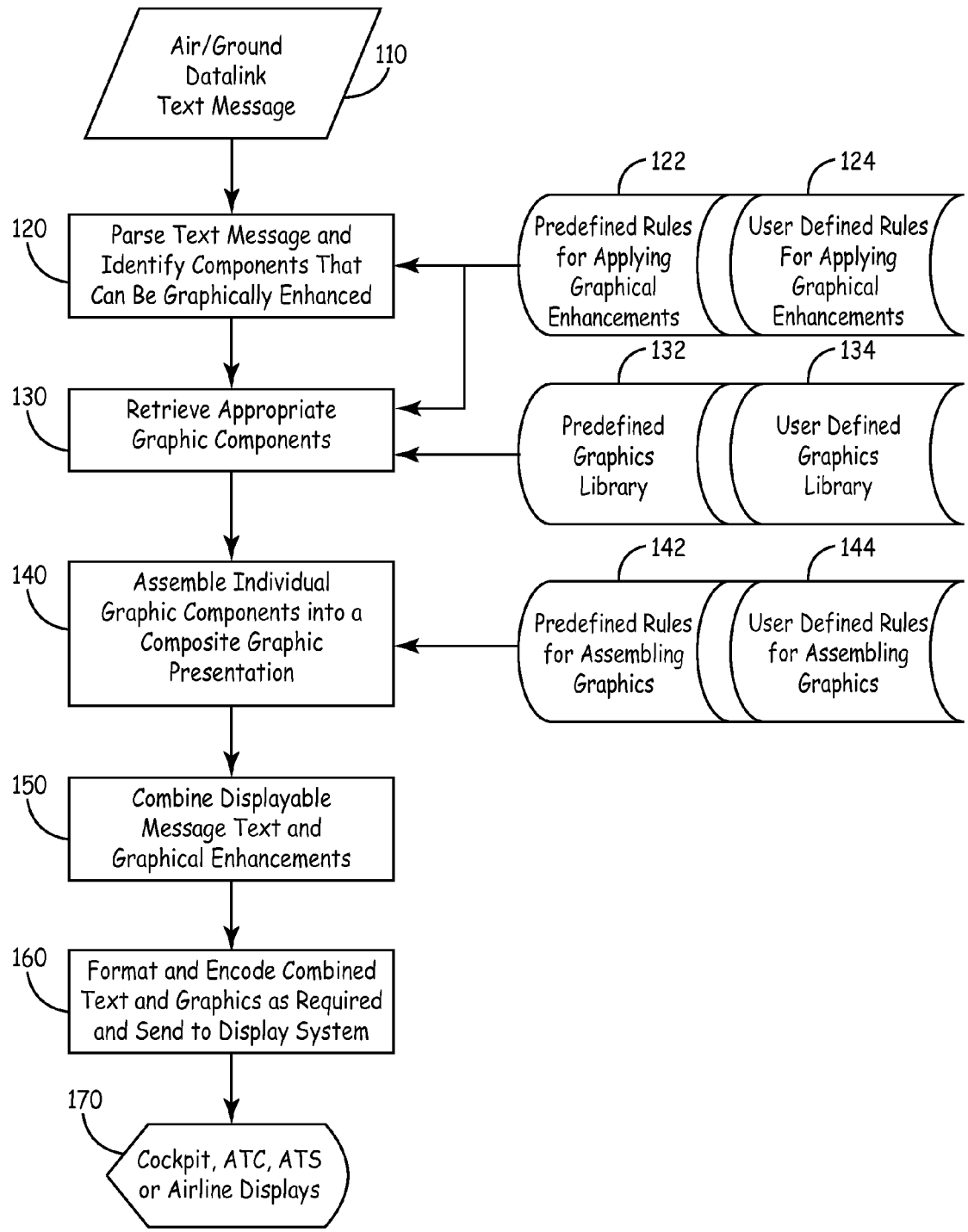
FIG. 1 is a flow diagram representing a method for generating graphically enhanced air/ground datalink text messages.

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method of producing graphically enhanced data communications. The present method can be implemented in a datalink application used in aircraft communications in order to reduce pilot and/or air traffic controller workload. The use of such graphically enhanced data communciations reduces the time required to understand and reply to longer messages, especially those with several interdependent components. By enhancing or replacing text based messages with graphics, the message is more readily comprehended. This will reduce flight crew workload and help eliminate misinterpretation of messages.

The present method can be implemented as part of the datalink software in a communication management function (CMF), such as the EPIC® CMF (available from Honeywell), of a communication management unit (CMU); in a flight management computer (FMC) such as an FMC hosting a datalink application; or in any other avionics computer in an aircraft. The present method can also be implemented in a flight deck communications function (FDCF); a flight management function (FMF); in datalink avionics equipment from original equipment manufacturers (OEMs); and in buyer furnished equipment (BFE) datalink avionics equipment for airlines.

Additionally, the present method can be implemented in the communication protocols of the datalink software in an air traffic control (ATC) computer; in electronic flight bag (EFB) applications; or other display devices such as air traffic control displays, maritime displays, and the like.

The present method can be used in graphical enhancements of fixed applications, which include fixed message sets driven by industry standards, and variable applications. Examples of fixed applications include Future Air Navigation Systems (FANS) such as Controller Pilot Data Link Communications (CPDLC), which is used to supply controller/aircrew exchange services; Flight Information Service (FIS); Air Traffic Services (ATS) Facilities Notification (AFN), which is the FANS application used for Data Link Initiation Capability (DLIC), with DLIC being a datalink function used to associate technical addresses for datalink with a flight plan in the ground system; and Automatic Dependent Surveillance (ADS). Other exemplary fixed applications with fixed message sets driven by industry standards include those in the Aeronautical Telecommunications Network (ATN) such as CPDLC; Context Management (CM), which is the ATN application used for DLIC; and ADS.

Examples of variable message sets that are user defined include Airline Operational Communications (AOC), and Aeronautical Administration Communication (AAC). Since airlines are not limited to rules such as those applied to CPDLC, an airline can tailor text messaging to its own needs.

The CPDLC application provides a fixed number of elements, with each element corresponding to a specific predefined text message. In the present method, an individual graphic can be assigned to each element or series of elements in the CPDLC application. A load-up table can be used to assemble the individual graphics into a composite graphic presentation for display that corresponds to elements in a transmitted datalink text message.

The method of the invention is described in further detail as follows with respect to the drawings.

FIG. 1 is a flow diagram representing a method for generating graphically enhanced air-to-ground or ground-to-air (air/ground) datalink text messages. Initially, an air/ground datalink text message is sent to an aircraft or a ground facility such as an airline facility (block 110). The text message is parsed and components of the message are identified that can be graphically enhanced (block 120) by employing predefined rules 122 for applying graphical enhancements, or user defined rules 124 for applying graphical enhancements. Examples of such rules for applying graphical enhancements can include the following:

Represent MAINTAIN [altitude] as a horizontal arrow pointing to the right. Place a label "FLnnn", where nnn is the [altitude] in hundreds of feet, above the arrow.

Represent [position] as a four-pointed star. If the position is an airport, place a label "XXXX", where XXXX is the airport's International Civil Aviation Organization (ICAO) code, next to the star.

Represent CLIMB as an arrow pointing upward at a 45 degree angle.

Represent REPORT as a graphical talking head.

Appropriate graphic components are then retrieved (block 130) from a predefined graphics library 132 or a user defined graphics library 134 with the use of the predefined rules 122 or the user defined rules 124. The graphic components can be static graphics or animated graphics.

The individual graphic components are then assembled into a composite graphic presentation (block 140) using predefined rules for assembling graphics 142, or user defined rules for assembling graphics 144. Examples of such rules for assembling graphics can include the following:

For a vertical directive, begin the graphic string with a side-view aircraft symbol.

For a vertical directive, the composite graphic should flow from left to right.

Place REPORT symbols next to graphic elements representing reporting points.

For a vertical directive, string the graphic elements together chronologically with the leftmost element (aircraft symbol) being time now and the rightmost element being the final state.

A displayable message text is then combined with the graphical enhancements (block 150). The combined text and graphics are formatted and encoded as required for display and are sent to a display system (block 160). The graphically enhanced message is then viewable on a cockpit, ATC, ATS, or airline facility display screen (block 170).

Figure 2:
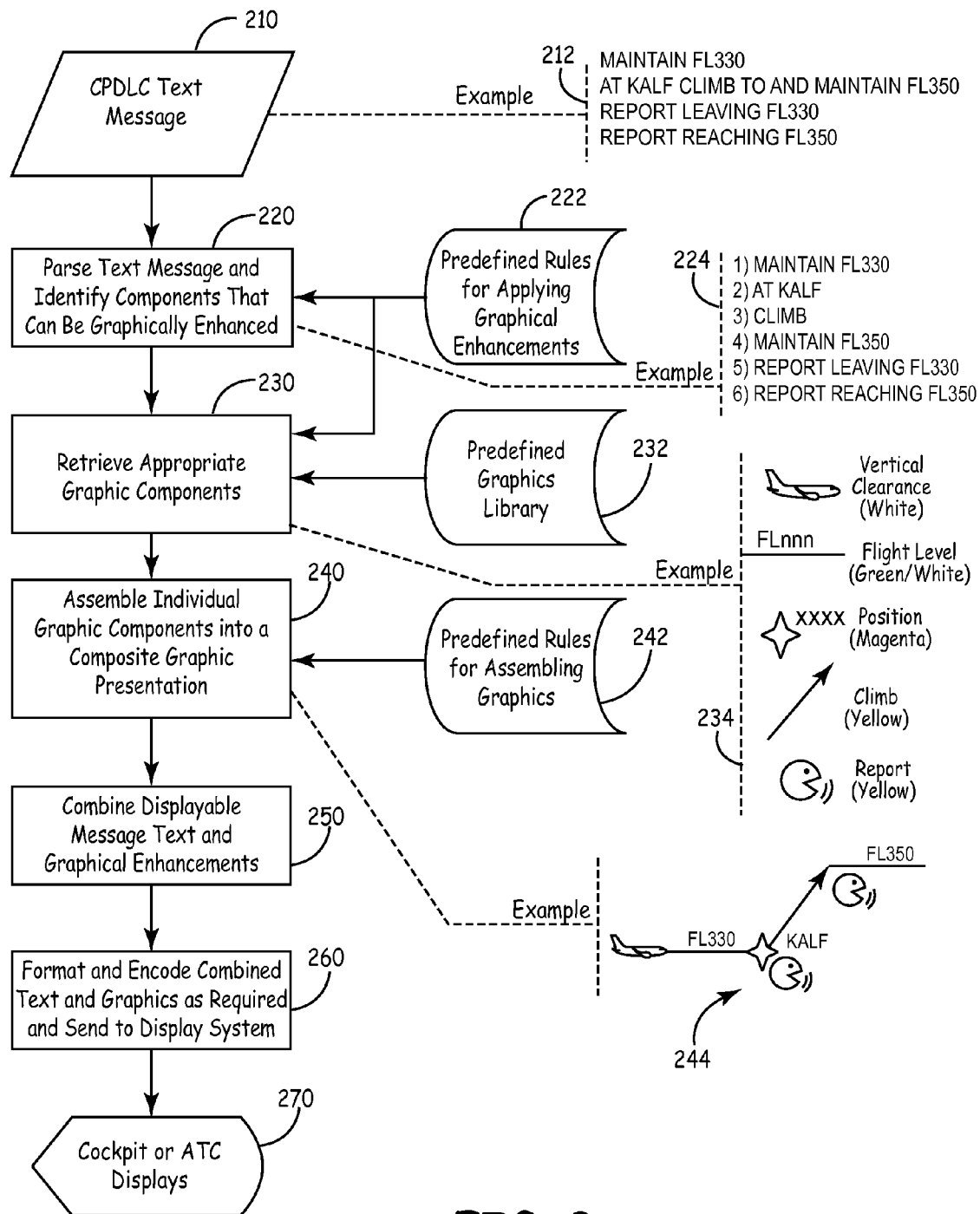
FIG. 2 is a flow diagram representing a method for generating graphically enhanced CPDLC text messages.

The method described with respect to FIG. 1 can be used in a specific graphical enhancement for a single, fixed application such as in CPDLC, which uses a fixed message set driven by industry standards. For example, FIG. 2 is a flow diagram representing a method for generating graphically enhanced CPDLC text messages.

Initially, a CPDLC text message is sent to an aircraft or an ATC center (block 210). For example, the message can be a CPDLC uplink containing the following message components as set forth in FIG. 2 at 212:
MAINTAIN FL330
AT KALF CLIMB TO AND MAINTAIN FL350
REPORT LEAVING FL330
REPORT REACHING FL350

The text message is parsed and components of the message are identified that can be graphically enhanced (block 220) by employing predefined rules 222 for applying graphical enhancements. For example, the message can be parsed as follows (set forth in FIG. 2 at 224):
1) MAINTAIN FL330
2) AT KALF
3) CLIMB
4) MAINTAIN FL350
5) REPORT LEAVING FL330
6) REPORT REACHING FL350

Appropriate graphic components are then retrieved (block 230) from a predefined graphics library 232 with use of the predefined rules 222. Exemplary graphic components are shown in FIG. 2 at 234 and can include components for vertical clearance, flight level, position, climb, and report, which can be presented in varying colors. The individual graphic components are then assembled into a composite graphic presentation (block 240) using predefined rules for assembling graphics 242. An exemplary composite graphic is shown in FIG. 2 at 244 using the above graphic components. A displayable message text is then combined with the graphical enhancements in a displayable format (block 250). The combined text and graphics are formatted and encoded as required for display and are sent to a display system (block 260). The graphically enhanced message is then viewable on a cockpit or ATC display screen (block 270).

Figure 3:
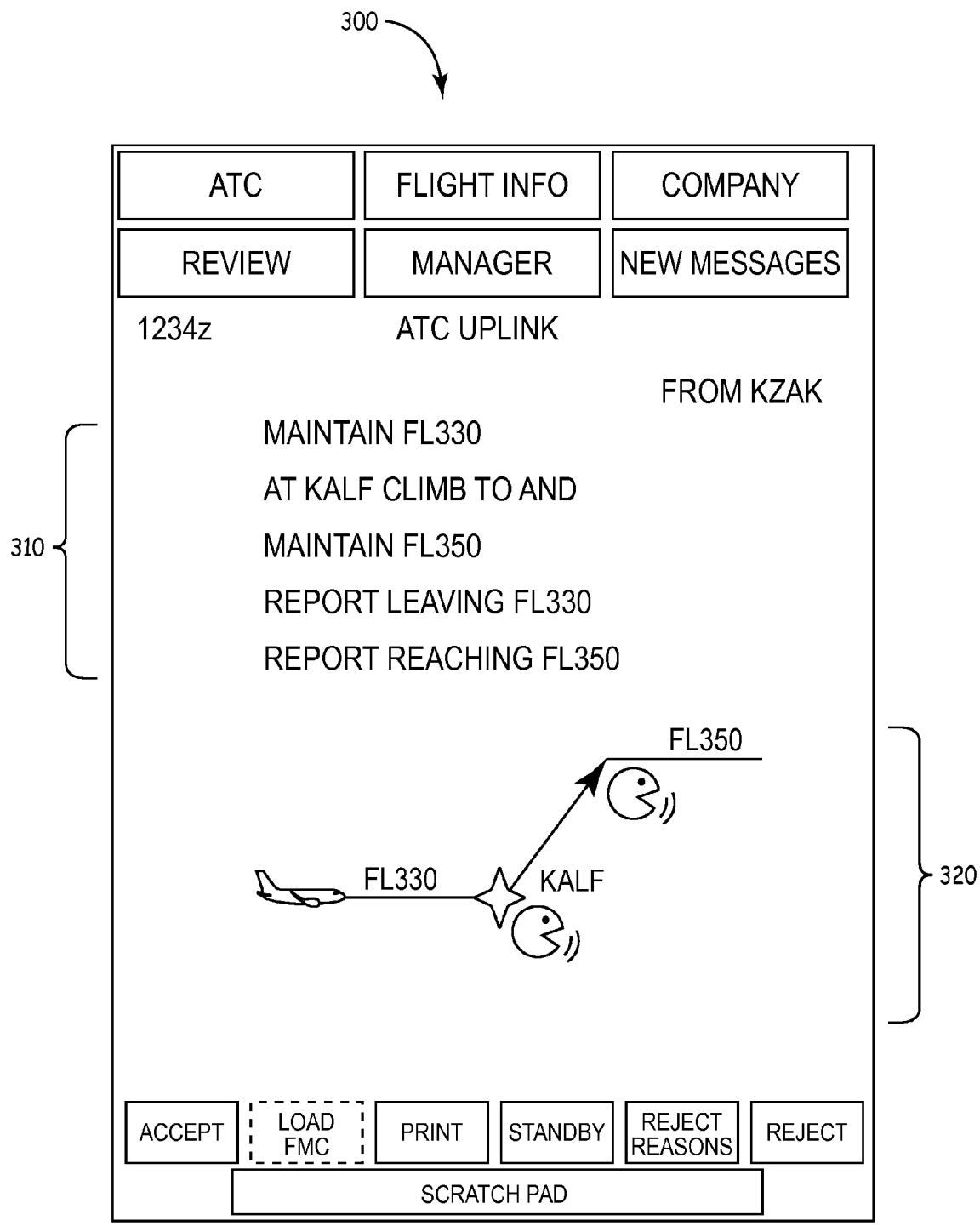
FIG. 3 depicts an exemplary display screen having a graphically enhanced CPDLC text message according to one embodiment.

FIG. 3 depicts an exemplary display screen 300 having a graphically enhanced CPDLC text message based on the text and graphic components described with respect to FIG. 2. The display screen 300 shows a text portion 310 and a related graphics portion 320. The graphically enhanced CPDLC text message in FIG. 3 can be used for vertical clearance instructions, and is interpreted as follows:

MAINTAIN FL330 (flight level maintained at 33,000 feet);

AT KALF CLIMB TO AND MAINTAIN FL350 (at certain position, climb to and maintain flight level of 35,000 feet);

REPORT LEAVING FL330 (report to ATC when leaving flight level of 33,000 feet);

REPORT REACHING FL350 (report to ATC when reaching flight level of 35,000 feet).

Figure 4:
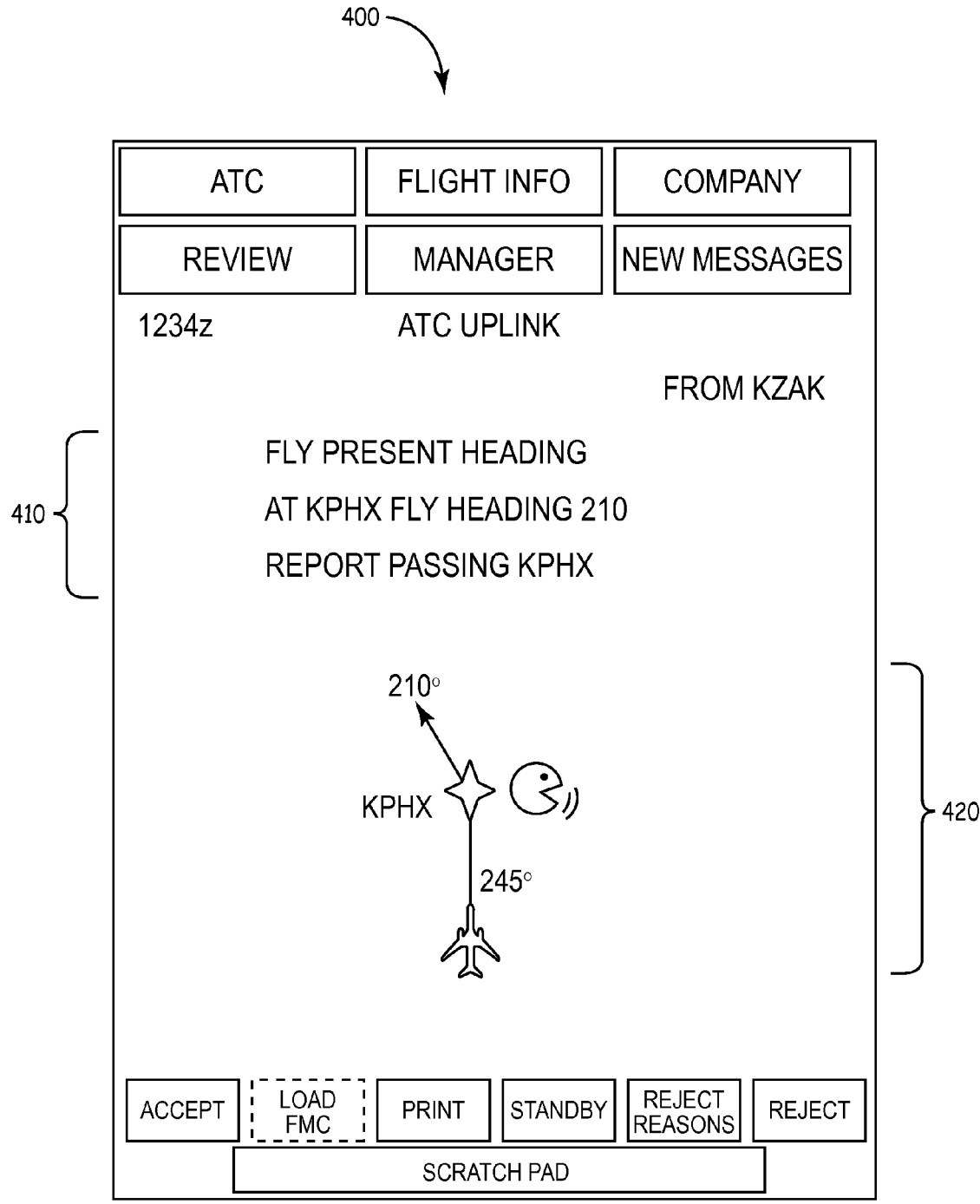
FIG. 4 depicts an exemplary display screen having a graphically enhanced CPDLC text message according to another embodiment.

FIG. 4 depicts an exemplary display screen 400 having a graphically enhanced CPDLC text message that is different from that shown in FIG. 3. The display screen 400 shows a text portion 410 and a related graphics portion 420. The graphically enhanced CPDLC text message in FIG. 4 can be used for horizontal clearance instructions, and is interpreted as follows:

FLY PRESENT HEADING (heading of 245 degrees is maintained);

AT KPHX FLY HEADING 210 (heading changed to 210 degrees at certain position);

REPORT PASSING KPHX (report to ATC when certain position is passed and heading is changed).

Advantageously, the graphically enhanced CPDLC text messages can be comprehended more quickly than the text message alone, thereby reducing pilot and/or air traffic controller workload.

It should be noted that the ground and avionics implementations of the present method utilize the same unique features but are independent of each other. Thus, the present method can function even if only one of the aircraft or the air traffic control system has been implemented with software for providing graphically enhanced text messages. The present method can be implemented for an aircraft by modifying conventional avionics software to add instructions for generating graphically enhanced text messages. The present method can be implemented for an air traffic control system on the ground by modifying the air traffic controller workstation software to add instructions for generating graphically enhanced text messages.

Instructions for carrying out the various process tasks, calculations, and generation of signals and other data used in the operation of the method of the invention can be implemented in software, firmware, or other computer readable instructions. These instructions are typically stored on any appropriate computer readable medium used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media; or any other media that can be used to carry or store desired program code means in the form of computer executable instructions or data structures. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, etc. that perform particular tasks or implement particular abstract data types. These represent examples of program code means for executing steps of the methods disclosed herein. The particular sequence of such executable instructions or associated data structures represent examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method of producing graphically enhanced data communications from an aircraft or an air traffic control center, the method comprising:
   receiving a text message comprising a controller pilot data link communication (CPDLC) text message, a data link initiation capability text message, an automatic dependent surveillance text message, an airline operational communications text message, or an aeronautical administration communication text message;
   parsing the text message into message components;
   identifying the message components capable of graphical enhancement by using rules for applying graphical enhancements;
   retrieving appropriate graphic components from a graphics library corresponding to the identified message components using the rules for applying graphical enhancements, the graphic components comprising representations of aircraft navigational instructions;
   assembling the graphic components into a composite graphic presentation using rules for assembling graphics; and
   combining the text message with the composite graphic presentation for display.

2. The method of claim 1, wherein the text message is an air-to-ground or ground-to-air text message.

3. The method of claim 1, wherein the text message is received by an aircraft or a ground facility.

4. The method of claim 1, wherein the rules for applying graphical enhancements are predefined.

5. The method of claim 1, wherein the rules for applying graphical enhancements are user defined.

6. The method of claim 1, wherein the graphics library is a predefined graphics library.

7. The method of claim 1, wherein the graphics library is a user defined graphics library.

8. The method of claim 1, wherein the rules for assembling graphics are predefined.

9. The method of claim 1, wherein the rules for assembling graphics are user defined.

10. The method of claim 1, wherein the combined text message and composite graphic presentation are viewable on a display system.

11. The method of claim 10, wherein the display system is implemented as part of an aircraft cockpit, an air traffic control center, or an airline facility.

12. A computer having instructions stored therein for a method of producing graphically enhanced data communications according to claim 1.

13. The computer of claim 12, wherein the computer comprises a flight communication management unit, a flight management computer, or an air traffic control computer.

14. The computer of claim 12, wherein the text message is an air-to-ground or ground-to-air text message.

15. A non-transitory computer readable medium having instructions stored thereon for a method of producing graphically enhanced data communications from an aircraft or an air traffic control center, the method comprising:
   receiving a text message comprising a controller pilot data link communication (CPDLC) text message, a data link initiation capability text message, an automatic dependent surveillance text message, an airline operational communications text message, or an aeronautical administration communication text message;
   parsing the text message into message components;
   identifying the message components capable of graphical enhancement by using rules for applying graphical enhancements;

retrieving appropriate graphic components from a graphics library corresponding to the identified message components using the rules for applying graphical enhancements, the graphic components comprising representations of aircraft navigational instructions;

assembling the graphic components into a composite graphic presentation using rules for assembling graphics; and combining the text message with the composite graphic presentation for display.

16. The non-transitory computer readable medium of claim 15, wherein the text message is an air-to-ground or ground-to-air text message.

17. A system for producing graphically enhanced data communications from an aircraft or an air traffic control center, the system comprising:

a processor; and at least one computer readable medium operatively coupled to the processor, the computer readable medium having instructions executable by the processor to perform a method comprising:

receiving a text message comprising a controller pilot data link communication (CPDLC) text message, a data link initiation capability text message, an automatic dependent surveillance text message, an airline operational communications text message, or an aeronautical administration communication text message;

parsing the text message into message components;

identifying the message components capable of graphical enhancement by using rules for applying graphical enhancements;

retrieving appropriate graphic components from a graphics library corresponding to the identified message components using the rules for applying graphical enhancements, the graphic components comprising representations of aircraft navigational instructions;

assembling the graphic components into a composite graphic presentation using rules for assembling graphics; and combining the text message with the composite graphic presentation for display.

\* \* \* \* \*

UNITED STATES PATENT AND TRADEMARK OFFICE
CERTIFICATE OF CORRECTION

| | | |
|---|---|---|
| PATENT NO. | : 8,335,988 B2 | Page 1 of 1 |
| APPLICATION NO. | : 11/866004 | |
| DATED | : December 18, 2012 | |
| INVENTOR(S) | : Fahy | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this
Seventeenth Day of September, 2013

Teresa Stanek Rea
*Deputy Director of the United States Patent and Trademark Office*